(12) United States Patent
Harrison et al.

(10) Patent No.: US 6,622,170 B1
(45) Date of Patent: Sep. 16, 2003

(54) SYSTEM AND METHOD FOR DEN/LDAP CLIENT DATABASE ACCESS WITH A BACKOFF CAPABILITY

(75) Inventors: Bret Elliott Harrison, Clayton, NC (US); William Donald Reed, Wake Forest, NC (US); Leo Temoshenko, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/393,641

(22) Filed: Sep. 10, 1999

(51) Int. Cl.[7] .................. G06F 15/177; G06F 15/16
(52) U.S. Cl. .................. 709/221; 709/203; 709/219; 709/220; 709/225; 709/229; 707/10
(58) Field of Search .................. 709/221, 203, 709/217, 219, 220, 223, 225, 229; 707/1, 3, 4, 10, 100, 103 R, 102, 513

(56) References Cited

U.S. PATENT DOCUMENTS

| | | | | |
|---|---|---|---|---|
| 5,175,849 A | | 12/1992 | Schneider | 707/202 |
| 5,313,646 A | | 5/1994 | Hendricks et al. | 707/101 |
| 5,339,430 A | | 8/1994 | Lundin et al. | 709/332 |
| 5,649,200 A | * | 7/1997 | Leblang et al. | 717/122 |
| 5,812,857 A | | 9/1998 | Nelson et al. | 717/173 |
| 5,832,511 A | * | 11/1998 | Beck et al. | 707/201 |
| 5,884,035 A | | 3/1999 | Butman et al. | 709/218 |
| 5,893,107 A | | 4/1999 | Chan et al. | 707/103 R |
| 6,014,669 A | * | 1/2000 | Slaughter et al. | 707/10 |
| 6,016,499 A | * | 1/2000 | Ferguson | 707/104 |
| 6,031,977 A | * | 2/2000 | Pettus | 709/230 |
| 6,044,367 A | * | 3/2000 | Wolff | 707/2 |
| 6,092,189 A | * | 7/2000 | Fisher et al. | 713/1 |
| 6,105,066 A | * | 8/2000 | Hayes, Jr. | 709/226 |
| 6,167,567 A | * | 12/2000 | Chiles et al. | 717/173 |
| 6,236,988 B1 | * | 5/2001 | Aldred | 707/3 |
| 6,324,547 B1 | * | 11/2001 | Lennert et al. | 707/204 |
| 6,324,571 B1 | * | 11/2001 | Hacherl | 709/208 |
| 6,347,312 B1 | * | 2/2002 | Byrne et al. | 707/3 |

FOREIGN PATENT DOCUMENTS

| | | | |
|---|---|---|---|
| GB | 02-330224 | 4/1999 | G06F/17/30 |
| JP | 10-254749 | 9/1998 | G06F/12/00 |

OTHER PUBLICATIONS

Single System Image With Network File System, IBM TDB 03–92 v34 n10B, p 408–409.

* cited by examiner

*Primary Examiner*—Frantz B. Jean
(74) *Attorney, Agent, or Firm*—Gerald R. Woods (57) ABSTRACT

A system and method for DEN/LDAP client database access with backoff capability. A current tree of directory information maintained at an LDAP server is used by LDAP clients to retrieve policy configuration information. When an LDAP client wishes to update policy configuration information, a new tree is created by cloning the current or a previous tree or by building a new tree. When the LDAP client is finished updating the new tree, the path for using LDAP clients is set to the new tree and the clients are requested to read LDAP policy configuration information using the new path. If the new tree of policy configuration information is found to be unsuitable, the clients' path is reset to the original tree and the clients are requested to read LDAP information policies using the reset path.

6 Claims, 7 Drawing Sheets

SYSTEM AND METHOD FOR DEN/LDAP CLIENT DATABASE ACCESS WITH A BACKOFF CAPABILITY

BACKGROUND OF THE INVENTION

The present invention relates in general to data processing systems, and more particularly, to a system and method for Lightweight Directory Access Protocol (LDAP) client database access with backoff capability.

Information describing the various users, applications, files, printers and other resources accessible from a network is often collected into a special database, sometimes called a directory. As the number of different networks and applications has grown, the number of specialized directories of information has also grown, resulting in islands of information that cannot be shared and are difficult to maintain.

The Lightweight Directory Access Protocol (LDAP) is an open directory standard that has evolved to meet these needs. LDAP defines a standard method for accessing and updating information in a directory. LDAP is gaining wide acceptance as the directory access method of the Internet and is therefore becoming strategic within corporate intranets.

A directory is a specialized database, also called a data repository, that stores typed and ordered information about objects. Directories allow users or applications to find resources that have the characteristics needed for a particular task. A directory has characteristics that sets it apart from general purpose relational databases. One special characteristic of directories is that they are accessed (read or searched) much more often than they are updated (written). Because directories must be able to support high volumes of read requests, they are typically optimized for read access. Write access might be limited to system administrators or to the owner of each piece of information.

Another important difference between a directory and a general-purpose database is in the way information can be accessed. Most databases support a standardized, very powerful access method called Structured Query Language (SQL). SQL allows complex update and query functions at the cost of program size and application complexity. LDAP directories, on the other hand, use a simplified and optimized access protocol that can be used in relatively simple applications.

Directories are usually accessed using the client/server model of communication. An application that wants to read or write information in a directory does not access the directory directly. Instead, it has the function for application programming interface (API) that causes a message to be sent to another process. The second process accesses the information in the directory on the path of the requesting application. The results of the read or write operation are then returned to the requesting application. The request is performed by the directory client, and a process that looks up information in the directory is called the directory server. The format and content of the messages exchanged between client and server must adhere to an agreed upon protocol. LDAP defines a message protocol used by directory clients and directory servers. There is also an associated LDAP API for the C language and ways to access LDAP from within a Java application. The client is not dependent upon a particular implementation of the server, and the server can implement the directory however it chooses.

The directory itself can be centralized or distributed. If a directory is centralized, there is one directory server that provides access to the directory. If the directory is distributed, there is more than one server that provides access to the directory. When a directory is distributed, the information stored in the directory can be partitioned or replicated. When information is partitioned, each directory server stores a unique and non-overlapping subset of the information. That is, each directory entry is stored by one and only one server. When information is replicated, the same directory entry is stored by more than one server. In a distributed directory, some information may be partitioned, and some information may be replicated. The three "dimensions" of a directory: scope of information, location of clients, and distribution of servers are independent of each other.

LDAP was developed as a lightweight alternative to the directory access protocol (DAP) which is used by the Internet Engineering Task Force (IETF) X.500 standard created in 1988. LDAP requires the lighter weight and more popular TCP/IP protocol stack rather than the OSI protocol stack. LDAP defines a communication protocol. That is, it defines the transport and format messages used by a client to access data in an X.500-like directory. LDAP does not define the directory service itself.

A common directory infrastructure encourages new uses. The Directory Enabled Networks (DEN) Initiative is a proposal to allow information about network configuration, protocol information, router and switch characteristics, Virtual Private Networks (VPNs), etc., to be stored in an LDAP directory. The availability of this information in a common format for many equipment vendors allows the intelligent management and provisioning of network resources. Within the networking industry, DEN is currently viewed as a key piece to building intelligent networks, where products from multiple vendors can store and retrieve topology and configuration information from an LDAP server. Through DEN, these devices and services use LDAP to implement authentication and policy services, allowing guaranteed end-to-end quality of service (QOS) and other features.

LDAP defines the content of messages exchanged between an LDAP client and an LDAP server. The messages specify the operations requested by the client (search, modify, delete, etc.), the responses from the server, and the format of data carried in the messages. LDAP messages are carried over TCP/IP, a connection-oriented protocol; so that there are also operations to establish and disconnect a session between the client and server.

The general interaction between an LDAP client and an LDAP server takes the following form:
1. The client establishes a session with an LDAP server. This is known as binding to the server.
2. The client then performs operations on directory data. LDAP offers both read and update capabilities. This allows directory information to be managed as well as queried.
3. When the client is finished making requests, it closes the session with the server. This is also known as unbinding.

A directory entry usually describes an object such as a person, a printer, a server, etc. Each entry has a name called a distinguished name (DN) that uniquely identifies it. The DN consists of a sequence of parts called relative distinguished names (RDNs), much like a file name consists of a path of directory names in many operating systems such as UNIX and WINDOWS. The entries are arranged into a hierarchical tree-like structure based on their distinguished names. This tree of directory entries is called the Directory Information Tree (DIT).

Each entry contains one or more attributes that describe the entry. Each attribute has a type and a value. A directory entry describes an object. An object class is a general description, sometimes called a template, of an object as opposed to the description of a particular object. The object classes that a directory server can store and the attributes they contain are described by a schema. Schema define the object classes that are allowed, the attributes that they must contain, the attributes that are optional, and the syntax of each attribute. One or more schemas may be supported by the client and server.

A VPN policy configuration application is used to define VPN policies between pairs of VPN devices. The VPN policies are stored in an LDAP server and subsequently downloaded to the VPN devices during initialization or upon request from a VPN network management application.

The VPN devices (LDAP clients) may access the LDAP server to retrieve their policies at any time due to initial startup or administrative request. The VPN policy configuration application (LDAP client) may access the LDAP server to alter one or more policy definitions at any time. Since the LDAP protocol currently has no locking mechanism, a variety of problems may result when one or more clients attempt to access the LDAP server for information while another client is in the process of altering the information contained in the LDAP server.

SUMMARY OF THE INVENTION

It is therefore an object of the present invention to provide a mechanism to enable LDAP clients to read information from an LDAP server directory while another LDAP client is attempting to update information.

The foregoing objective is achieved by maintaining a current tree of directory information that is used by LDAP clients to retrieve configuration information. The current tree is never altered. Whenever an LDAP client wants to update configuration information, i.e., add, change or delete, a new directory tree of configuration information is created. This creation may be done by cloning the parent tree, cloning a previous tree, or by starting from scratch. When the updating LDAP client is finished building a new directory tree of configuration information, the path definition of the information retrieval LDAP client is set to the new information tree and the information retrieval LDAP client is requested to re-read the LDAP directory information containing the new policies. If the new directory tree of policy configuration information is found to be defective, the path definition of the information retrieval LDAP client is reset to the original information tree and the information retrieval LDAP client is requested to re-read the LDAP information, in this case, the original policies.

BRIEF DESCRIPTION OF THE DRAWINGS

The invention is better understood by reading the following detailed description of the preferred embodiment in conjunction with the accompanying drawings, wherein.

DETAILED DESCRIPTION OF THE PREFERRED EMBODIMENT

The LDAP functional model determines how a client accesses and updates information in an LDAP directory, as well as how directory data can be manipulated. LDAP offers nine basic functional operations: add, delete, modify, bind, unbind, search, compare, modify distinguished name and abandon. The add, delete and modify operations govern changes to directory entries. Bind and unbind operations enable and terminate the exchange of authentication information between LDAP clients and servers, granting or denying end-users access to specific directories. The search operation locates specific users or services in the directory tree. Compare allows client applications to test the accuracy of specific values or information using entries in the LDAP directory. Modify distinguished name makes it possible to change the name of an entry. The abandon operation allows a client application to tell the directory server to drop an operation in progress. The LDAP protocol defines how the basic functional operations map onto TCP/IP. The protocol specifies the interaction between clients and servers and determines how LDAP requests and responses are formed, i.e., how the bits look on the wire.

Each LDAP update operation is atomic which means that the whole operation is processed as a single unit of work. This unit of work either completely succeeds or no modifications to the LDAP directory are performed. For example, a modify request that affects multiple attributes within an entry cannot partly succeed, with certain attributes being updated and others not being updated. If the client receives a successful result from the server, then all of the modifications were applied. If the server returns an error to the client, then none of the modifications were applied.

A policy configuration application provides a set of functions needed to configure virtual private network (VPN) and quality of service (QoS) policy definitions. The-policy definitions are stored in the LDAP server and are subsequently downloaded to the VPN/QoS devices.

A policy consists of a condition and an action. When a VPN/QoS device receives network traffic, the policy conditions are searched for a match. If a condition match is found, the associated action is performed. The following if-then statement illustrates the enforcement of a policy.

IF Network-Traffic matches Condition
   THEN Perform Action

The condition consists of a validity period and a traffic profile. The validity period defines the time frame in which the action should be performed. The traffic profile defines the type of network traffic for which the action should be performed. The action is actually composed of one or more sub-actions.

The action is actually composed of one or more sub-actions. These sub-actions consist of an Internet Protocol Security (IPSec) action, a Differential Services (DiffServ) action and a ReSerVation Protocol (RSVP) action. The IPSec action is further composed of an IPSec key management action and an IPSec data management action. The key management action and key management proposal component definitions of the IPSec action may be used in multiple policies as neither contains any device specific information. The data management action component definition of the IPSec action is unique to the policy as it contains device specific IP address information. The data management proposal, authentication header (AH) transform and encapsulated security payload (ESP) transform component definitions of the IPSec action may be used in multiple policies as none of them contain device specific information.

RSVP is a network control protocol that allows Internet applications to obtain special qualities-of-service (QoS's) for their data flows. This generally requires reserving resources along the data paths from source to destination. When an application in an IP host requests a specific QoS for its data stream, RSVP is used to deliver the request to each router along the path of the data stream and to maintain the router and IP host state to provide the requested service. The RSVP action component definition can be used in multiple policies since it does not contain device specific information.

DiffServ is an architecture that enables service providers to provide a range of network services which are differentiated on the basis of performance in addition to the pricing tiers used in the past. A specific performance level is requested on a packet-by-packet basis by marking the "DS" field of each packet with a specific value. The DS field is a small bit pattern in each packet, in the IPv4 Type of Service (TOS) octet or the IPv6 Traffic Class octet, that is used to mark a packet to receive a particular forwarding treatment, or per-hop-behavior, at each network node. The DiffServ action component definition can be used in multiple policies since it does not contain device specific information.

Figure 1:
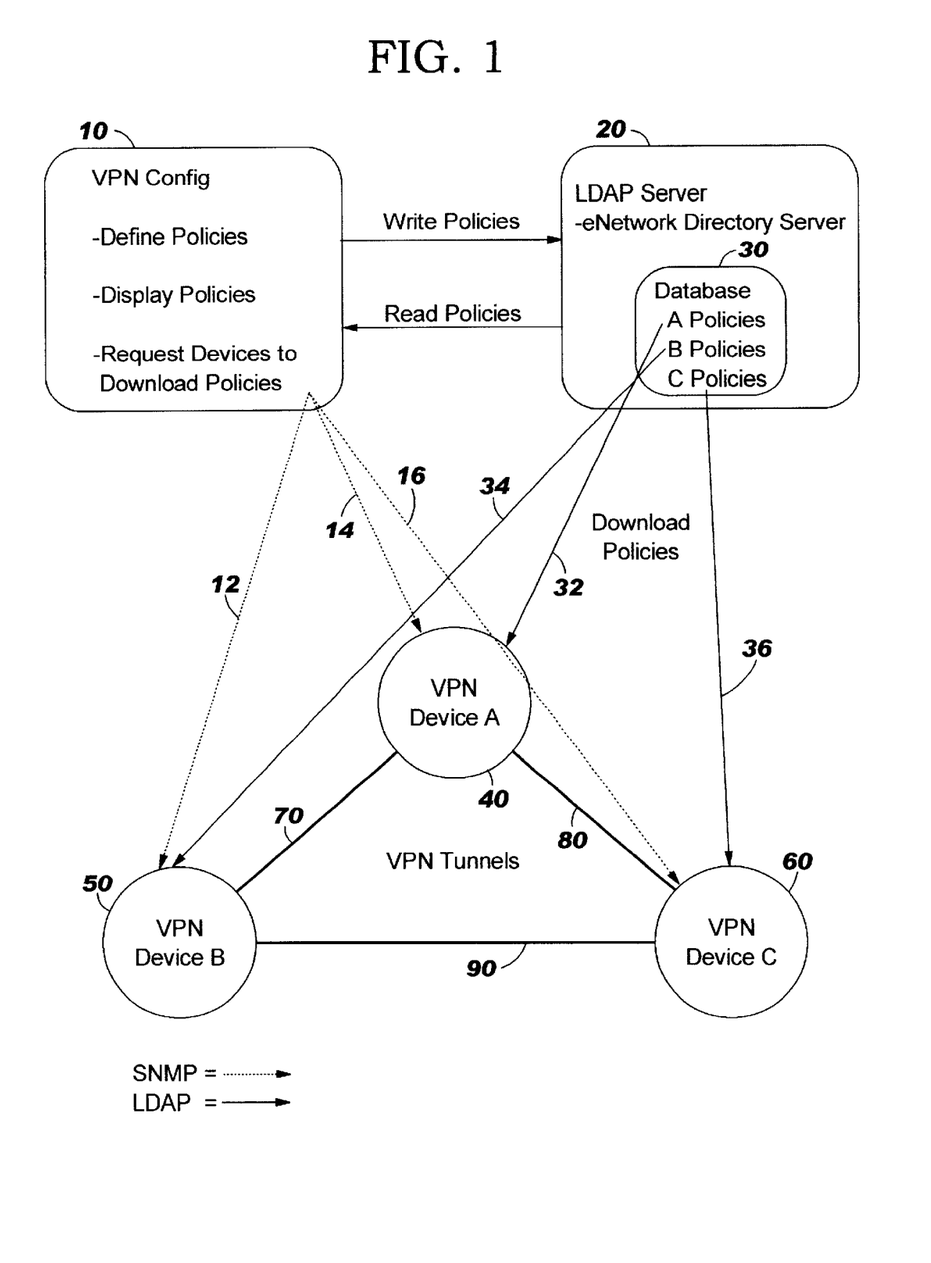
FIG. 1 illustrates the interactions between a virtual private network (VPN) configuration application, an LDAP server, and VPN devices.

FIG. 1 illustrates the interactions between the policy configuration application 10, the LDAP server 20, and the VPN/QoS devices 40, 50, 60. The policy configuration application 10 is used to define policies for all VPN/QoS devices 40, 50, 60. The policies are stored in directory 30 at LDAP server 20. The policies are subsequently downloaded to the VPN/QoS devices 40, 50, 60 during initialization or upon request from the policy configuration application 10. This is illustrated by links 32, 34, 36 for downloading policies A, B, and C to VPN device A 40, VPN device B 50, and VPN device C 60, respectively. VPN device A 40 is connected via VPN tunnels 70, 80 to VPN device B 50 and VPN device C 60, respectively. VPN device B 50 is connected to VPN device C 60 via VPN tunnel 90. VPN configuration application 10 sends SMNP requests 12, 14, 16 to request devices to download policies from LDAP server directory over links 34, 32, 36, respectively.

Figure 2:
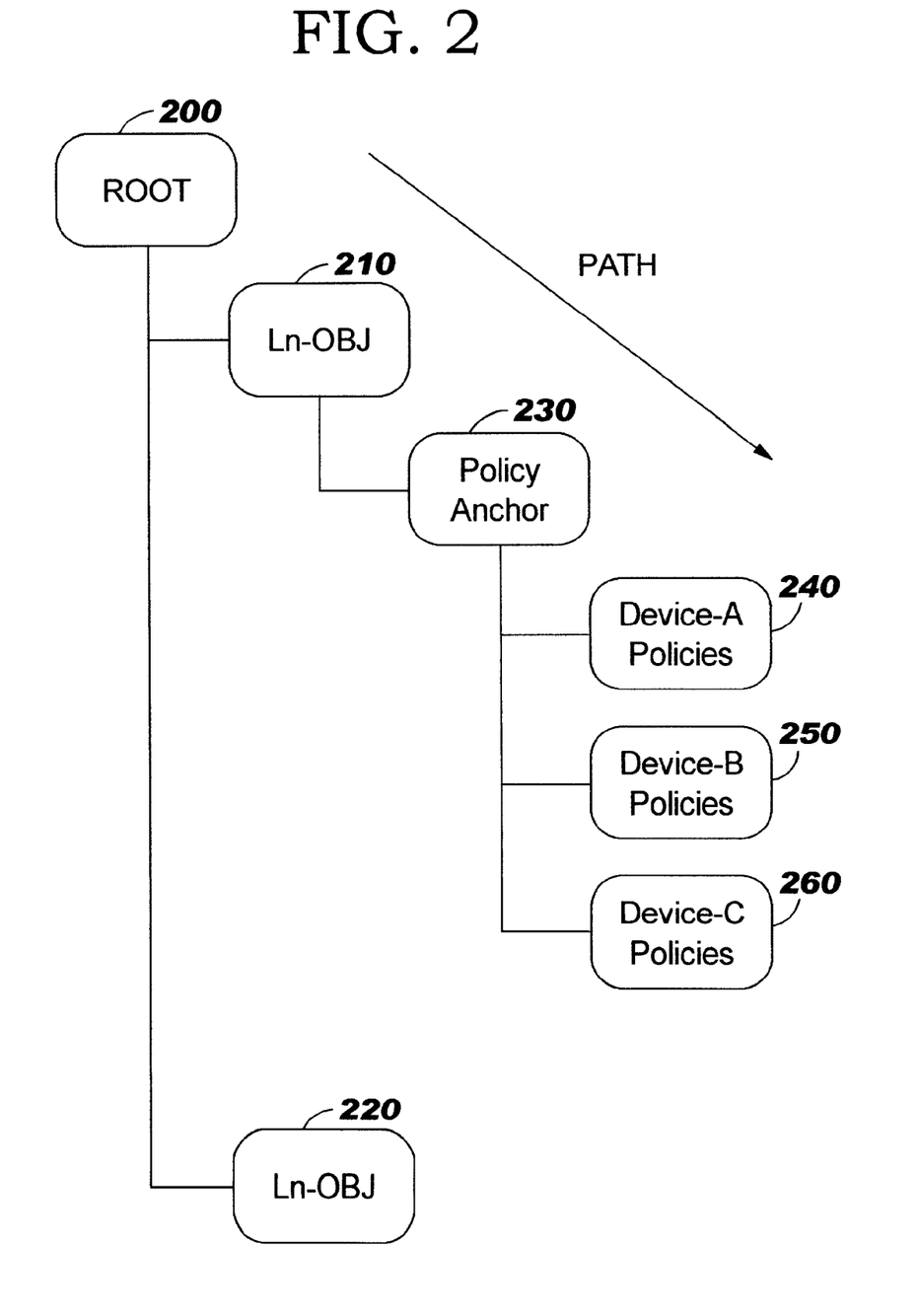
FIG. 2 illustrates a tree structure in which the LDAP server stores information.

As illustrated in FIG. 2, the LDAP server stores directory information in a tree structure. The topmost or root node 200 is shown with two directory configuration objects 210, 220 attached. Configuration object 210 is shown with policy anchor 230 attached. The leaf nodes under policy anchor 230 are device A policies 240, device B policies 250, and device C policies 260. Policy anchor 230 is equivalent to a directory; device A policies 240 is equivalent to a subdirectory. Since the LDAP protocol currently has no locking mechanism, a variety of problems may result when one or more client devices 40, 50, 60 attempt to access the LDAP server 20 for information contained in directory 30 while another client is in the process of altering the directory information contained in the LDAP server 20.

In an effort to address the problem of LDAP clients 40, 50, 60 attempting to read information from an LDAP server 20 while another LDAP client 10 is attempting to update information, the method of the present invention was developed. The key concepts of the method are the following:

1. The current tree of information which is being used by the clients to retrieve directory information is never altered.
2. Whenever an LDAP client wishes to update directory information (i.e., add/change/delete) a new directory tree of information is created. This creation may be done by cloning the current tree, cloning a previous tree, or building a new tree.
3. When the updating LDAP client is finished building the new directory tree of information, the path definition of the information retrieval LDAP client is set to the new directory information tree and the information retrieval LDAP client is administratively requested to re-read the LDAP directory information, in this case, the new policies.
4. If for some reason the new directory tree of information is found to be defective, the path definition of the information retrieval LDAP client is reset to the original information tree and the information retrieval LDAP client is administratively requested to re-read the LDAP information, in this case the original policies.

Figure 3:
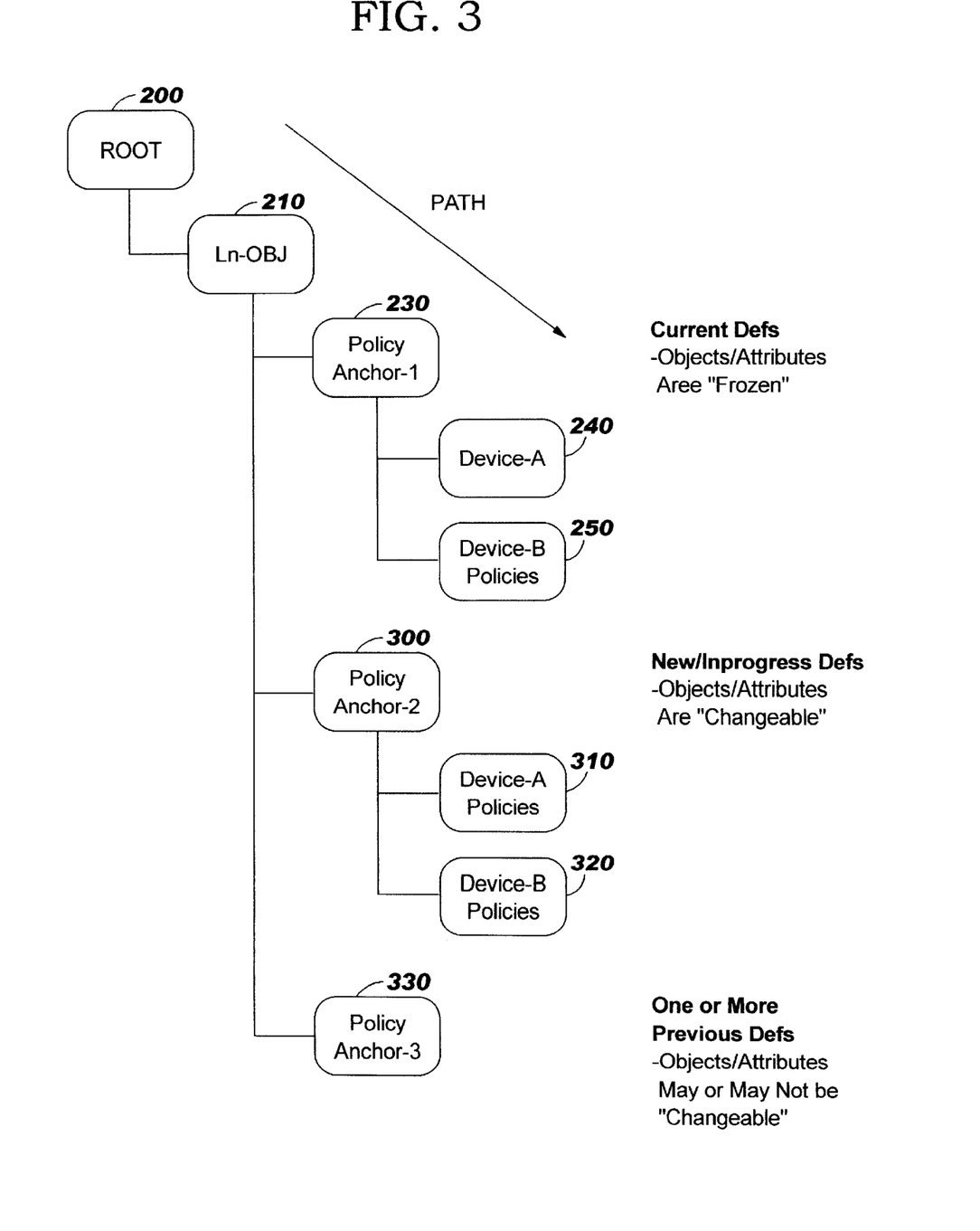
FIG. 3 illustrates the building of the new information tree for storing information at the LDAP server in a preferred embodiment of the present invention.

FIG. 3 illustrates the building of a new directory information tree. FIG. 3 shows configuration object 210 attached to root node 200. At the next level in the directory information tree below the configuration object 210, are policy anchor-1 230, policy anchor-2 300, and policy anchor-3 330. Associated with policy anchor-1 230 are device A policies 240 and device B policies 250. These device policies represent the current definitions of the information tree and its objects and attributes are frozen. Policy anchor-2 300 has attached to it device A policies 310 and device B policies 320. These represent new or in progress definitions of objects and attributes that are changeable. Finally, policy anchor-3 330 represents one or more previous definitions of policies. The objects and attributes may or may not be changeable.

Figure 4:
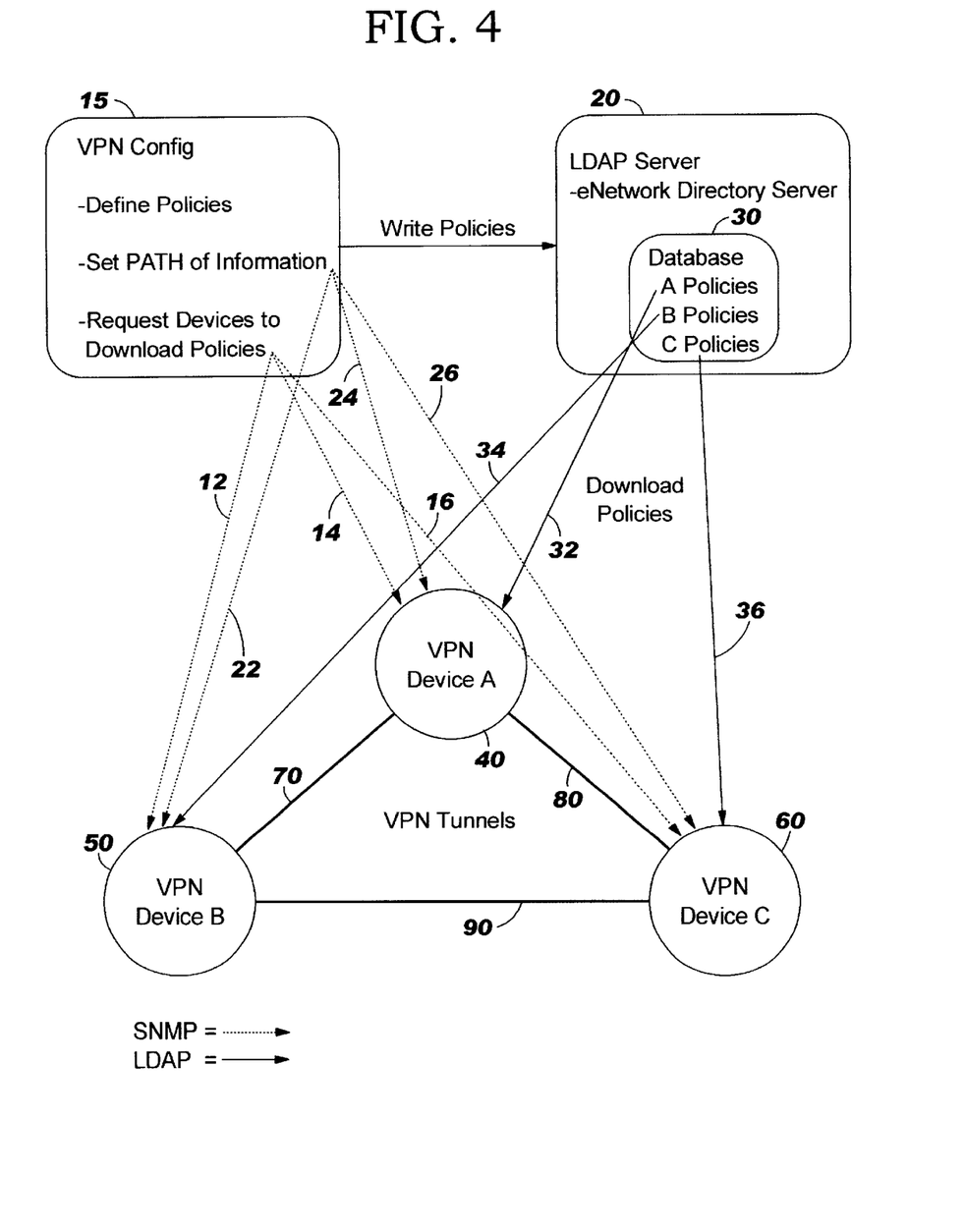
FIG. 4 illustrates the interactions between a VPN configuration application, an LDAP server and the VPN devices after the building of a new information tree in the preferred embodiment of the present invention.

FIG. 4 illustrates the device interaction after the building of a new directory information tree. VPN policy configuration application 15 defines policies and writes those policies to the LDAP server 20 where they are stored in the directory 30. VPN configuration application 15 also sets the path of information to allow updates to the policies while retrievals are occurring. It also requests devices to download policies. VPN device A 40 is shown connected to VPN device B by tunnel 70 and to VPN device C by tunnel 80. VPN device B is connected via tunnel 90 to VPN device C 60. The VPN configuration application 15 sets the path of information using SNMP commands 22, 24, 26 to VPN device B 50, VPN device A 40 and VPN device C 60, respectively. VPN configuration application 15 requests VPN device B 50, VPN device A 40, and VPN device C 60 to download policies using SNMP commands 12, 14, 16, respectively. The actual download of VPN policies is shown by links 32, 34, 36 from LDAP server directory 30 to VPN device A 40, VPN device B 50 and VPN device C 60, respectively.

Figure 5:
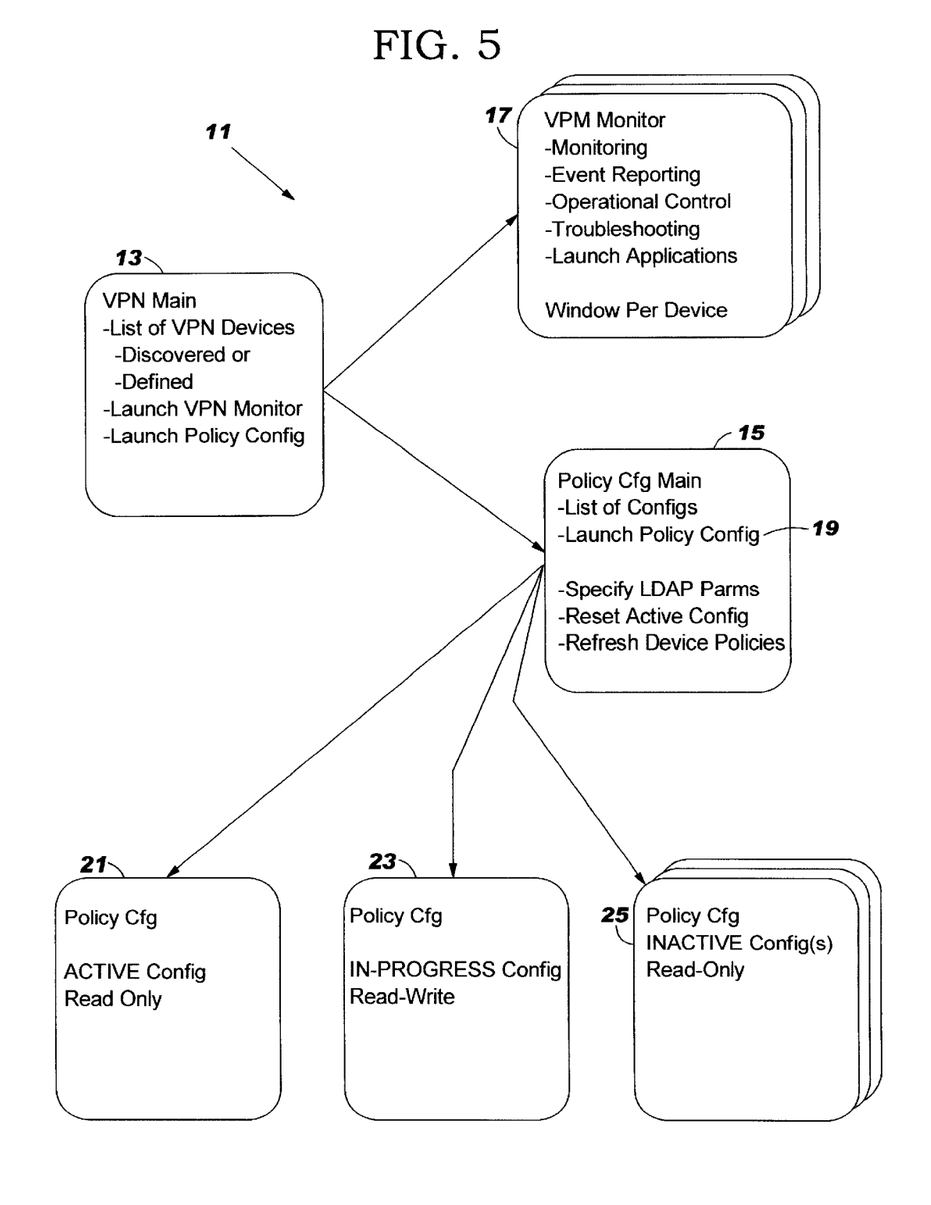
FIG. 5 illustrates the integration of a policy configuration application into a VPN network management application in the preferred embodiment of the present invention.

FIG. 5 illustrates the integration of the policy configuration application 15 into an existing VPN network management application 11. The integrated VPN network management application 11 is composed of a VPN main component 13 and a VPN monitoring component 17. The VPN main component 13 provides a display of all VPN devices 40, 50, 60 which were either automatically discovered or defined by the user. From the VPN main component 13, the VPN monitoring component 17 can be launched. The VPN monitoring component 17 provides monitoring, event reporting, troubleshooting, operational control and application launching functions for a specific VPN device. The VPN main component 13 provides a launching capability for the policy configuration application 15. The policy configuration application 15 provides the ability to define policies for all managed VPN devices 40, 50, 60.

The policy configuration main component 15 is launched from the VPN main component 13 and provides the starting point for all policy configuration functions. The organization of the categories and functions of the policy configuration main component 15 are illustrated in Table 1.

TABLE 1

| Category | Function |
| --- | --- |
| Policy Configurations | View List of Policy Configurations |
|  | Launch Policy Configuration Component |
|  | Switch Active Configuration |
|  | Refresh Active Configuration |
| Connection Parameters | Specific LDAP Server Connection Parameters |

The policy configurations category provides a view of a list of policy configurations contained in the LDAP server director 30, the ability to launch the policy configuration component 19 based on a specific configuration as well as the ability to switch the active policy configuration of the network and the ability to request the VPN devices 40, 50, 60 in the network to refresh/download their policies.

The policy configuration component 19 is launched from the policy configuration main component 15 based on an active policy configuration 21, an inactive policy configuration 23 or an in progress policy configuration 25. The application 15 provides read-only access to the active 21 and inactive policy configurations 25; and read-write access to the in progress policy configuration 23. The functions of the policy configuration component 19 are organized into a policy definitions category, a component definitions category and a policy validation category. The organization of the categories, subcategories and functions of the policy configuration component 19 are illustrated in Table 2.

TABLE 2

| Category | Sub-Category | Functions |
| --- | --- | --- |
| Policy Definitions | View Policies | View-Generated Definitions |
| Component Definitions | Policy Segments | View, Add, Modify, Delete, Generate Policies |
|  | Device References |  |
|  | Device Profiles | View, Add, Modify, Delete |
|  | Device Lists |  |
|  | IPSec Device | View, Add, Modify, Delete |
|  | QoS Device | View, Add, Modify, Delete |
|  | Remote ID Profiles | View, Add, Modify, Delete |
|  | Policy Templates | View, Add, Modify, Delete |
|  | Policy Conditions |  |
|  | Validity Periods | View, Add, Modify, Delete |
|  | Traffic Profiles Templates |  |
|  | Traffic Profile | View, Add, Modify, Delete |
|  | QoS Traffic | View, Add, modify, Delete |
|  | Traffic Profiles | View-Generated Definitions |
|  | Policy Actions |  |
|  | IPSec Actions |  |
|  | Key Management Actions | View, Add, Modify, Delete |
|  | Proposals | View, Add, Modify, Delete |
|  | Data Management |  |

TABLE 2-continued

| Category | Sub-Category | Functions |
| --- | --- | --- |
|  | Action Templates | View, Add, Modify, Delete |
|  | Actions | View-Generated Definitions |
|  | Proposals Transforms | View, Add, Modify, Delete |
|  | AH Transforms | View, Add, Modify, Delete |
|  | ESP Transforms | View, Add, Modify, Delete |
|  | Differential Services | View, Add, Modify, Delete |
|  | RSVP | View, Add, Modify, Delete |
| Policy Validation |  | View, Validate Policies |

The policy definitions category provides the ability to view generated policies on a policy segment basis, on a specific device basis or on an all devices basis. The policy definitions are generated from the policy segment subcategory of the component definitions category. Table 3 illustrates the attributes contained in the policy definitions category.

The following access codes are used in Table 3:
A1=read-only access for all policy configurations.
A2=read-write access for all policy configurations.
A3=read-write access for the in progress policy configuration.
A4=read-write access during add processing for the in progress configuration.

TABLE 3

| Field | Description | Access |
| --- | --- | --- |
| Selection Filter |  |  |
| Policy Segment Name | View Policies for this Policy Segment | A2 |
| Device Name Identification | View Policies for this Device | A2 |
| Device Name | The owner (device name) of the Policy | A1 |
| Policy Segment | The name of the Policy Segment which caused the creation of this Policy | A1 |
| Policy Name | The name of the Policy | A1 |
| Partner Device Name | The Policy partner's device name | A1 |
| Partner Policy Name | The name of the partner device's Policy | A1 |
| Device's Policy Directory Order | The relative order of the Policy for the device in the LDAP directory | A1 |
| Priority/Status |  |  |
| Policy Priority | The priority of the Policy (5-65,535; 5 is the lowest) | A1 |
| Policy Status | The status of the Policy (Enable/Disable) | A1 |
| Conditions |  |  |
| Validity Period | The name of the Validity Period | A1 |
| Traffic Profile | The name of the Traffic profile | A1 |
| Actions | Only one of the following must be present | A1 |
| Key Management | The name of the IPSec Key Management Action | A1 |
| Data Management | The name of the IPSec Data Management Action | A1 |
| Differential Services | The name of the Differential Services Action | A1 |
| RSVP | The name of the RSVP Action | A1 |

The component definitions category provides the ability to view the components of a policy in a policy configuration.

Additionally, it provides add, modify and delete capabilities for an in progress policy configuration. This category is divided into five main subcategories which consist of the policy segments subcategory, the device references subcategory, the policy templates subcategory, the policy conditions subcategory and the policy actions subcategory. Each subcategory will be discussed briefly below.

The policy segments subcategory provides the ability to view the policy segments in a policy configuration. Additionally, it provides add, modify, delete and policy generation capabilities for the in progress policy configuration. Status from the components of a policy segment is propagated to this subcategory and reflects the need to regenerate policy definitions.

The device references subcategory provides the ability to view device profiles, IPSec device Lists, QoS device lists and remote identification profiles in a policy configuration. Additionally, it provides add, modify and delete capabilities for the in progress policy configuration. A device profile must exist for each device in the configuration. One or more sets of device interface information (device interface profile) which is associated with the device profile must exist for each device which will be referenced in an IPSec device list or a QoS device list. Optionally, one or more remote identification profiles may exist for each device in the policy configuration and are extensions to a device interface profile. At least one IPSec device list must exist in order to define an IPSec policy segment. Likewise, at least one QoS device list must exist in order to define a differential services or RSVP policy segment. All device references are user-defined.

The policy templates subcategory provides the ability to view policy templates in a policy configuration. Additionally, it provides add, modify and delete capabilities for the in progress policy configuration. Policy templates are used to define a policy segment. At least one IPSec policy template must exist in order to define a IPSec policy segment. At least one differential services policy template must exist in order to define a differential services policy segment. At least one RSVP policy template must exist in order to define a RSVP policy segment. User-defined IPSec, differential services and RSVP policy templates based on parameters of their choice may be created within the in progress policy configuration.

The policy conditions subcategory provides the ability to view policy conditions in a policy configuration. Additionally, it provides add, modify and delete capabilities for the in progress policy configuration. Policy conditions are used to define a policy template. The policy conditions consist of validity periods, traffic profile templates, QoS traffic templates, base traffic profiles, ingress/egress traffic profiles and remote identification traffic profiles. A validity period must be defined for each IPSec, differential services and RSVP policy template which will be referenced in a policy segment. A traffic profile template must be defined for each device interface profile (IPSec only) and/or QoS traffic profile. A QoS policy template must be defined for each differential services or RSVP policy segment. User-defined validity periods, traffic profile templates and QoS traffic templates based on parameters of their choice may be created within the in progress policy configuration. The base traffic profiles, ingress/egress traffic profiles and remote identification traffic profiles are read-only sections which are generated from a policy segment.

The policy actions subcategory provides the ability to view policy actions in a policy configuration. Additionally, it provides add, modify and delete capabilities for the in progress policy configuration. Policy actions are used to define a policy template. At least one policy action must be defined in a policy template. The policy actions consist of IPSec actions, differential services actions and RSVP actions. The IPSec actions are further decomposed into key management actions, key management proposals, data management action templates, data management actions, data management proposals, authentication header (AH) transforms and encapsulating security payload (ESP) transforms. User-defined key management actions, key management proposals, data management action templates, data management proposals, AH transforms and ESP transforms based on chosen parameters may be created within the in progress policy configuration. The data management actions is a read-only section which is generated from a policy segment.

The policy validation category provides the ability to view the status of the validation and consistency checking processing of a policy configuration. Additionally, it provides the ability to trigger validation and consistency checking of the in progress policy configuration.

Figure 6A:
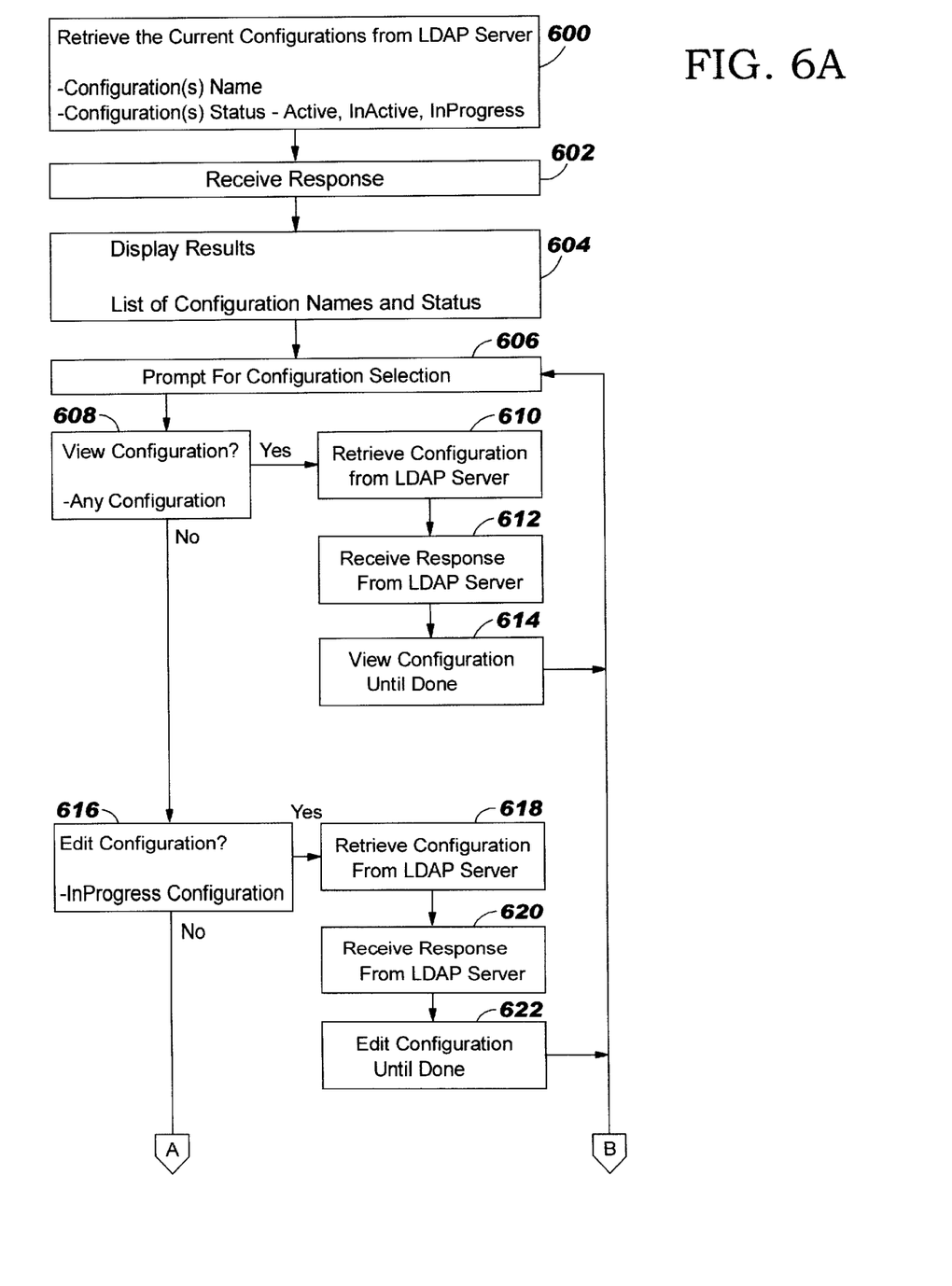
FIGS. 6A–6B illustrate the processing logic performed by a manager application in retrieving, displaying, viewing, editing and creating a policy configuration in the preferred embodiment of the present invention.
Figure 6B:
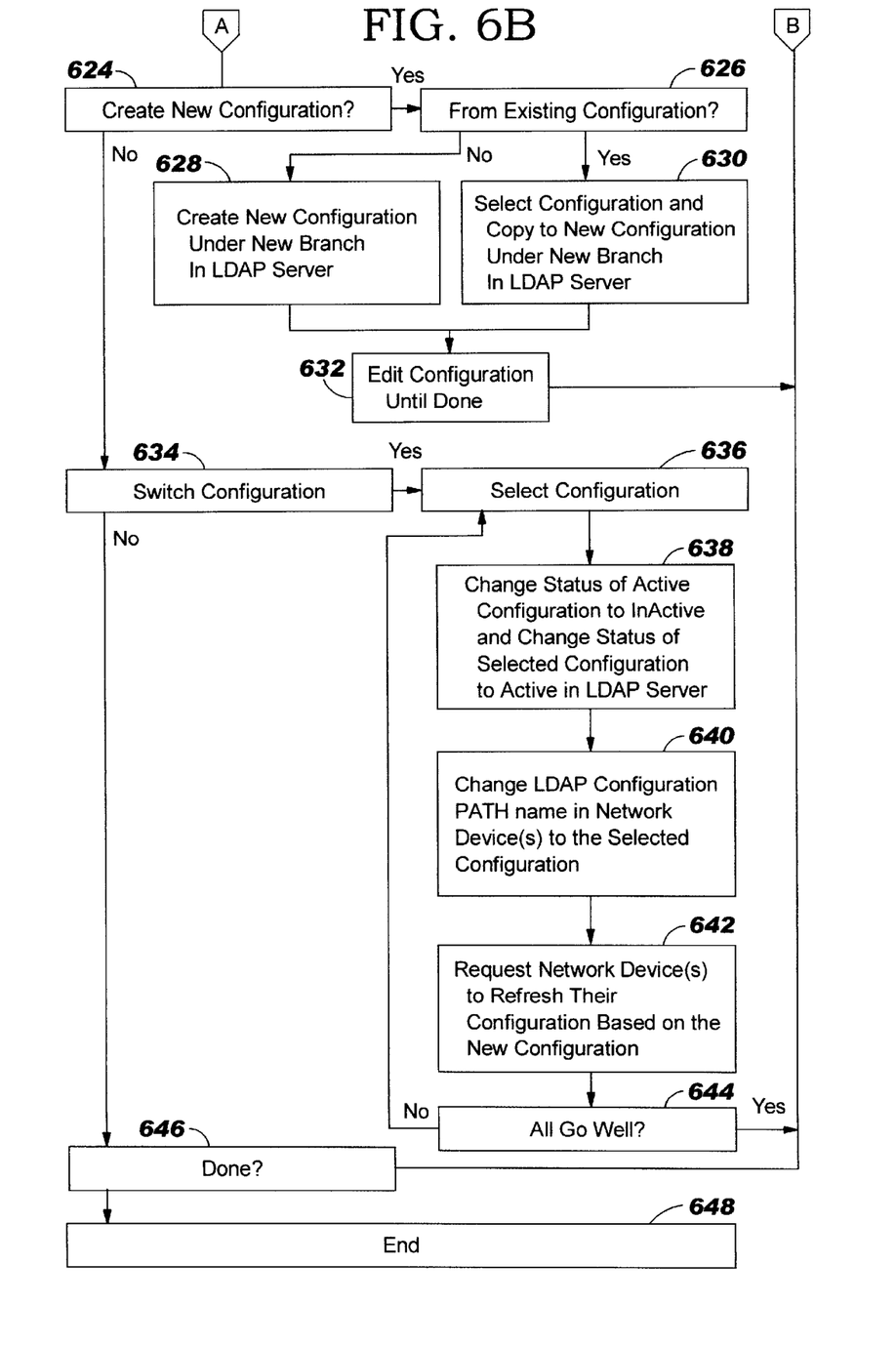

FIGS. 6A–6B depict the processing logic used by the VPN policy configuration application 15 of the present invention. In logic block 600, the VPN policy configuration application 15 retrieves the current policy configurations from the LDAP server 20. This information contains the configuration's name and the configuration status: active, inactive, or in progress for each policy configuration stored in the LDAP server directory 30. In logic block 602, the VPN policy configuration application 15 receives the response from the LDAP server 20. The results are displayed by the VPN policy configuration application 15 in a list of configuration names and status as indicated by logic block 604.

Next, in logic block 606 the VPN policy configuration application 15 prompts the network administrator (user) for configuration selection. In decision block 608 the VPN policy configuration application 15 determines if the user wants to view configuration information. If the determination is positive, processing proceeds with logic block 610 in which the requested configuration is retrieved from LDAP directory 30. This is followed by receiving a response from the LDAP server 20 as indicated by logic block 612. Finally, in logic block 614 the VPN policy configuration application 15 provides for the viewing of the policy configuration information until it is done.

If in decision block 608, a determination is made not to view any policy configuration information, processing proceeds with decision block 616 in which the user is asked whether he wants to edit policy configuration information. If yes, processing proceeds in logic block 618 in which the requested policy configuration information is retrieved from LDAP server directory 30. The selected policy configuration is considered to be in progress. In logic block 620 a response is received from the LDAP server 20 and in logic block 622 the user edits the policy configuration until done at which time processing returns to logic block 606 to prompt the user for additional policy configuration selections.

If in decision block 616, the user chooses not to edit any policy configurations, processing proceeds with decision block 624 in which the user is prompted to indicate if he wants to create a new policy configuration. If yes, processing continues with decision block 626 in which the user is asked if he wants to create a new policy configuration from an existing policy configuration. If yes, processing continues in logic block 630 in which the user selects the policy configuration and copies it to a new policy-configuration under a new branch in the LDAP server directory tree 30.

Processing continues in logic block 632 where the user edits the policy configuration until complete.

If in decision block 626, the user decides to create a new policy configuration not based on an existing policy configuration, processing continues in logic block 628 in which the user creates a new policy configuration under a new branch in the LDAP server directory 30. Processing then continues in logic block 632 in which the user edits the policy configuration until he is done. Processing from logic block 632 loops back to logic block 606 in which the user is prompted again to select another policy configuration.

If the user in decision block 624 does not want to create a new policy configuration, he is asked in decision block 634 if he wants to switch a policy configuration. If the response is no, processing continues in decision block 646 in which the user is asked if he is done with policy configuration modification and update. If he is, processing ends as indicated by logic block 648. If not, processing returns to logic block 606 where the user is prompted again for selection of another policy configuration.

If in decision block 634, the user confirms that he wants to switch a policy configuration, processing continues in logic block 636 in which the user selects a policy configuration. Next, in logic block 638, the user changes status of an active policy configuration to inactive, and changes status of a selected policy configuration to active in the LDAP server directory. In logic block 640, the user changes the LDAP configuration path name in the network devices to the selected policy configuration. Next, in logic block 642, the user requests the network device to refresh its policy configuration based on the new policy configuration. This is followed by decision block 644 in which a decision is made as to whether the refresh of the policy configuration was successful. If not, processing returns to logic block 636 to select another policy configuration. If the configuration was refreshed successfully, processing returns to logic block 606 where the user is prompted for selection of another policy configuration.

The DEN/LDAP client database access with backoff mechanism of the present invention has been described as a computer program that can be resident on one or more host computers such as a network device, a network management platform, or a server. As such, the DEN/LDAP client database access with backoff mechanism can be stored as an application on any VPN network device. It is important to note, however, that those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as cassettes or CD ROMS and transmission type media such as analog or digital communication links.

Additionally, corresponding structures, materials, acts, and equivalents of all means plus function elements in the claims below are intended to include any structure, material, or acts for performing the functions in combination with other claimed elements as specifically claimed.

While the invention has been particularly shown and described with reference to a preferred embodiment thereof, it will be understood by those skilled in the art that various changes in form and detail may be made without departing from the spirit and scope of the present invention.

What is claimed is:

1. A method for accessing information stored in a server directory in a client-server computer system comprising a server and a plurality of client devices connected by a computer network, the method comprising the steps of:

selecting an existing configuration from a list of configurations stored in the server directory;

replicating the existing configuration under a new branch of the server directory;

editing the replicated configuration to create a new configuration;

determining if an existing active configuration for a client device should be changed to the new configuration;

selecting the new configuration from the server directory;

changing the status of the active configuration for the client device to inactive in the server directory;

changing the status of the selected configuration for the client device to active in the server directory;

changing a configuration path name in the client device to the selected configuration; and resetting the configuration path name in the client device to a previously active configuration if the selected configuration is determined to be defective.

2. The method of claim 1 further including the step of requesting the client device to refresh its configuration based on the reset configuration path name.

3. A computer program product adaptable for storage on a program storage media at a host machine in a client-server computer system comprising a server and a plurality of client devices connected by a computer network, the computer program product operable in conjunction with a first client device for accessing information stored in a server directory, the computer program product comprising:

program code for selecting an existing configuration from a list of configurations stored in the server directory;

program code for replicating the existing configuration under a new branch of the server directory;

program code for editing the replicated configuration to generate a new configuration;

product code for determining if an existing active configuration for a client device should be changed to the new configuration;

product code for selecting the new configuration;

product code for changing the status of the active configuration for the client device to inactive in the server directory;

product code for changing the status of the selected configuration for the client device to active in the server directory;

product code for changing a configuration path name in the client device to the selected configuration; and program code for resetting the configuration path name in the client device to a previously active configuration if the selected configuration for the client device is determined to be defective.

4. The computer program product claim of claim 3 further including program code for requesting the client device to refresh its configuration based on the reset configuration path name.

5. A system for accessing information stored in a server directory in a client-server computer system comprising a server and a plurality of client devices connected by a computer network, the system comprising:

a user interface for selecting an existing configuration from a list of configurations stored in the server directory;

means for replicating the existing configuration under a new branch of the server directory;

a user interface for editing the replicated configuration to create a new configuration,;

means for determining if an existing active configuration for a client device should be changed to another selected configuration;

a user interface for selecting a new configuration from the server directory;

a user interface for changing the status of the active configuration for the client device to inactive in the server directory;

a user interface for changing the status of the selected configuration for the client device to active in the server directory;

a user interface for changing a configuration path in the client device to the selected configuration; and means for resetting the configuration path name in the client device to a previously active configuration if the selected configuration for the client device is determined to be defective.

6. The systen of claim 5 further including means for requesting the client device to refresh its configuration based on the reset configuration path name.

* * * * *